United States Patent
Zhao

(10) Patent No.: US 9,417,139 B2
(45) Date of Patent: Aug. 16, 2016

(54) TEMPERATURE MEASUREMENT HEAD STRUCTURE AND CLINICAL THERMOMETER

(76) Inventor: Zhigang Zhao, Shenzhen (CN)

( * ) Notice: Subject to any disclaimer, the term of this patent is extended or adjusted under 35 U.S.C. 154(b) by 314 days.

(21) Appl. No.: 14/384,391

(22) PCT Filed: Sep. 28, 2011

(86) PCT No.: PCT/CN2011/080316
§ 371 (c)(1),
(2), (4) Date: Sep. 11, 2014

(87) PCT Pub. No.: WO2013/044470
PCT Pub. Date: Apr. 4, 2013

(65) Prior Publication Data
US 2016/0041044 A1    Feb. 11, 2016

(51) Int. Cl.
*G01J 5/00*     (2006.01)
*G01K 13/00*    (2006.01)
*G01J 5/06*     (2006.01)
*G01J 5/02*     (2006.01)

(52) U.S. Cl.
CPC ............. *G01K 13/004* (2013.01); *G01J 5/0011* (2013.01); *G01J 5/0205* (2013.01); *G01J 5/06* (2013.01)

(58) Field of Classification Search
CPC .... G01K 13/004; G01J 5/0011; G01J 5/0205; G01J 5/06
See application file for complete search history.

(56) References Cited

U.S. PATENT DOCUMENTS

2004/0076217 A1* 4/2004 Lin ........................... G01J 5/02
374/121

FOREIGN PATENT DOCUMENTS

TW    DE 10135937 A1 *   2/2003 ................ G01J 5/02

* cited by examiner

*Primary Examiner* — Casey Bryant
(74) *Attorney, Agent, or Firm* — Matthias Scholl, PC; Matthias Scholl

(57) ABSTRACT

A temperature measurement head structure comprises a shell (14), a tube-shaped thermal conductor (13), a cap-shaped thermal conductor (12) and an infrared sensor (11). Detection holes are arranged at a front end of the shell (14) and a front end of the cap-shaped thermal conductor (12). The tube-shaped thermal conductor (13) is located inside the shell (14). A bottom surface of the infrared sensor (11) and an end portion of the tube-shaped thermal conductor (13) are closely adhered to the detection hole at the front end of the shell (14). The cap-shaped thermal conductor (12) surrounds the infrared sensor (11) and is sleeved on an external wall at the end portion of the tube-shaped thermal conductor (13). The detection hole at the front end of the cap-shaped thermal conductor (12) is located behind the detection hole at the front end of the shell (14). The temperature measurement head structure further comprises an air gap (20) formed between top and side surfaces of the infrared sensor (11) and the cap-shaped thermal conductor (12). Also provided is a clinical thermometer comprising the temperature measurement head structure. The clinical thermometer has a simple structure, and greatly improves the precision and reliability of temperature measurement.

10 Claims, 2 Drawing Sheets

US 9,417,139 B2

TEMPERATURE MEASUREMENT HEAD STRUCTURE AND CLINICAL THERMOMETER

CROSS-REFERENCE TO RELATED APPLICATIONS

This application is a National Stage Appl. filed under 35 USC 371 of International Patent Application No. PCT/CN2011/080316 with an international filing date of Sep. 28, 2011, designating the United States, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a temperature measurement head and a thermometer comprising the same.

2. Description of the Related Art

Infrared body temperature measurement technology has been widely applied. It adopts an infrared sensor to receive infrared rays irradiated from the human body and adopts a temperature measuring circuit module to process the infrared signals whereby obtain the body temperature. Compared with conventional mercury thermometers, the infrared thermometer based on the infrared body temperature measurement technology is superior in fast and convenient measurement, no involvement in any poisonous matters like mercury, and pollution free.

Working principle of the infrared thermometer is as follows: a thermocouple disposed inside the sensor is configured to detect the temperature difference between an upper surface and a lower surface of the thermocouple itself. Specifically, when infrared rays from the human body are received by the upper surface of the thermocouple, the temperature of the upper surface increases. Thus, a temperature difference between the upper surface and the lower surface of the thermocouple is produced, and the thermocouple outputs a voltage signal of the temperature difference to enable the measuring circuit of the infrared thermometer to process whereby obtaining the body temperature.

A typical infrared thermometer generally has problems of too large a temperature drift and inaccurate temperature measurement because the infrared thermometer tends to be disturbed by the body temperature. For example, when the sensor is inserted into an ear canal for measuring the body temperature, the heat energy is directly transferred to a window (an upper surface) and a sidewall of the sensor via a temperature measurement head, and is further transferred to the thermocouple disposed inside the sensor of the infrared thermometer to enable the thermocouple to produce a temperature difference, and therefore an error voltage signal is produced, thereby causing temperature measurement errors. When the body temperature is measured at a low temperature by inserting the sensor into the ear canal, the measurement error will be much larger due to the relatively large temperature difference between the environment and the ear canal. Sometimes, the temperature difference exceeds 1° C., which seriously decreases the reliability and accuracy of the thermometer.

SUMMARY OF THE INVENTION

In view of the above-described problems, it is one objective of the invention to provide a temperature measurement head that can eliminate the influence of the body temperature of the measured object on the accuracy of the measurement result.

It is another objective of the invention to provide a thermometer comprising the temperature measurement head that features high measurement reliability and accuracy.

To achieve the above objective, in accordance with one embodiment of the invention, there is provided a temperature measurement head comprising: a casing, a tubular conductor, a cap-shaped conductor, an infrared sensor, and an air gap. Both the casing and the cap-shaped conductor comprise a detecting hole at a front end thereof. The tubular conductor is disposed inside the casing. A bottom surface of the infrared sensor is attached to an end part of the tubular conductor and corresponds to the detecting hole of the front end of the casing. The cap-shaped conduct surrounds the infrared sensor and is tightly fitted over an outer wall of the end part of the tubular conductor. The detecting hole of the front end of the cap-shaped conductor is disposed behind the detecting hole of the front end of the casing. The air gap is disposed between an outer sidewall surface and a top surface of the infrared sensor and corresponding inner sidewall surface and inner bottom surface of the cap-shaped conductor and completely separates the outer sidewall surface and the top surface of the infrared sensor from the corresponding inner sidewall surface and inner bottom surface of the cap-shaped conductor.

In a class of this embodiment, the infrared sensor comprises a ring-shaped flange disposed at one end of the bottom surface thereof. The end part of the tubular conductor fitting the infrared sensor comprises a recess for positioning and fitting the ring-shaped flange. An inner side of the cap-shaped conductor comprises a step so as to fit an upper surface of the ring-shaped flange and press the infrared sensor on the end part of the tubular conductor. The fitting and positioning between the recess and the ring-shaped flange together with the tight fitting and positioning between the cap-shaped conductor and the tubular conductor ensure the complete isolation of the outer sidewall surface and the top surface of the infrared sensor from the corresponding inner sidewall surface and inner bottom surface of the cap-shaped conductor by the air gap.

In a class of this embodiment, the infrared sensor comprises a ring-shaped flange disposed at one end of the bottom surface thereof. An outer diameter of the ring-shaped flange is equivalent to an outer diameter of the end part of the tubular conductor fitting the infrared sensor. An inner side of the cap-shaped conductor comprises a step that fits an upper surface of the ring-shaped flange and presses the infrared sensor on the end part of the tubular conductor. The fitting and positioning between an outer sidewall of the ring-shaped flange and an inner sidewall of the cap-shaped conductor ensures the complete isolation of the outer sidewall surface and the top surface of the infrared sensor from the corresponding inner sidewall surface and inner bottom surface of the cap-shaped conductor by the air gap.

In a class of this embodiment, the ring-shaped flange comprises a chamfer or a fillet disposed at one side of the upper surface thereof.

In a class of this embodiment, the infrared sensor comprises a flange disposed at one end of the bottom surface thereof. The end part of the tubular conductor fitting the infrared sensor comprises a recess for positioning and fitting with the flange. An inner side of the cap-shaped conductor comprises a step that fits an upper surface of the flange and presses the infrared sensor on the end part of the tubular conductor. The fitting and positioning between the recess and the flange together with the tight fitting and positioning between the cap-shaped conductor and the tubular conductor ensure the complete isolation of the outer sidewall surface and the top surface of the infrared sensor from the corresponding inner sidewall surface and inner bottom surface of the cap-shaped conductor by the air gap.

In accordance with another embodiment of the invention, there is provided a thermometer comprising a thermometer body and a temperature measurement head disposed on the thermometer body. The temperature measurement head comprises: a casing, a tubular conductor, a cap-shaped conductor, an infrared sensor, and an air gap. Both the casing and the cap-shaped conductor comprise a detecting hole at a front end thereof. The tubular conductor is disposed inside the casing. A bottom surface of the infrared sensor is attached to an end part of the tubular conductor and corresponds to the detecting hole of the front end of the casing. The cap-shaped conduct surrounds the infrared sensor and is tightly fitted over an outer wall of the end part of the tubular conductor. The detecting hole of the front end of the cap-shaped conductor is disposed behind the detecting hole of the front end of the casing. The air gap is disposed between an outer sidewall surface and a top surface of the infrared sensor and corresponding inner sidewall surface and inner bottom surface of the cap-shaped conductor and completely separates the outer sidewall surface and the top surface of the infrared sensor from the corresponding inner sidewall surface and inner bottom surface of the cap-shaped conductor.

In a class of this embodiment, the infrared sensor comprises a ring-shaped flange disposed at one end of the bottom surface thereof. The end part of the tubular conductor fitting the infrared sensor comprises a recess for positioning and fitting the ring-shaped flange. An inner side of the cap-shaped conductor comprises a step so as to fit an upper surface of the ring-shaped flange and press the infrared sensor on the end part of the tubular conductor. The fitting and positioning between the recess and the ring-shaped flange together with the tight fitting and positioning between the cap-shaped conductor and the tubular conductor ensure the complete isolation of the outer sidewall surface and the top surface of the infrared sensor from the corresponding inner sidewall surface and inner bottom surface of the cap-shaped conductor by the air gap.

In a class of this embodiment, the infrared sensor comprises a ring-shaped flange disposed at one end of the bottom surface thereof. An outer diameter of the ring-shaped flange is equivalent to an outer diameter of the end part of the tubular conductor fitting the infrared sensor. An inner side of the cap-shaped conductor comprises a step so as to fit an upper surface of the ring-shaped flange and press the infrared sensor on the end part of the tubular conductor. The fitting and positioning between an outer sidewall of the ring-shaped flange and an inner sidewall of the cap-shaped conductor ensures the complete isolation of the outer sidewall surface and the top surface of the infrared sensor from the corresponding inner sidewall surface and inner bottom surface of the cap-shaped conductor by the air gap.

In a class of this embodiment, the ring-shaped flange comprises a chamfer or a fillet disposed at one side of the upper surface thereof.

In a class of this embodiment, the infrared sensor comprises a flange disposed at one end of the bottom surface thereof. The end part of the tubular conductor fitting the infrared sensor comprises a recess for positioning and fitting with the flange. An inner side of the cap-shaped conductor comprises a step that fits an upper surface of the flange and presses the infrared sensor on the end part of the tubular conductor. The fitting and positioning between the recess and the flange together with the tight fitting and positioning between the cap-shaped conductor and the tubular conductor ensure the complete isolation of the outer sidewall surface and the top surface of the infrared sensor from the corresponding inner sidewall surface and inner bottom surface of the cap-shaped conductor by the air gap.

Advantages according to embodiments of the invention are summarized as follows:

1. By arranging the air gap between the cap-shaped conductor and the infrared sensor, the superb insulation property of the air is utilized to prevent the heat energy of the measured object from transferring to the infrared sensor via the casing and the cap-shaped conductor, so that the temperature measurement errors caused by the heat energy of the measured object is effectively prevented, and the accuracy and reliability of the temperature measurement of the thermometer is largely improved.

2. The structure of the temperature measurement head is simple, and the measurement accuracy is largely improved with low costs.

3. The temperature measurement head can not only be utilized in the thermometer but also be utilized in other temperature measuring devices that utilize the infrared rays irradiated from the measured object to measure the temperature of the measured object.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a temperature measurement head and a thermometer comprising the same are described below. It should be noted that the following examples are intended to describe and not to limit the invention.

Example 1

Figure 1:
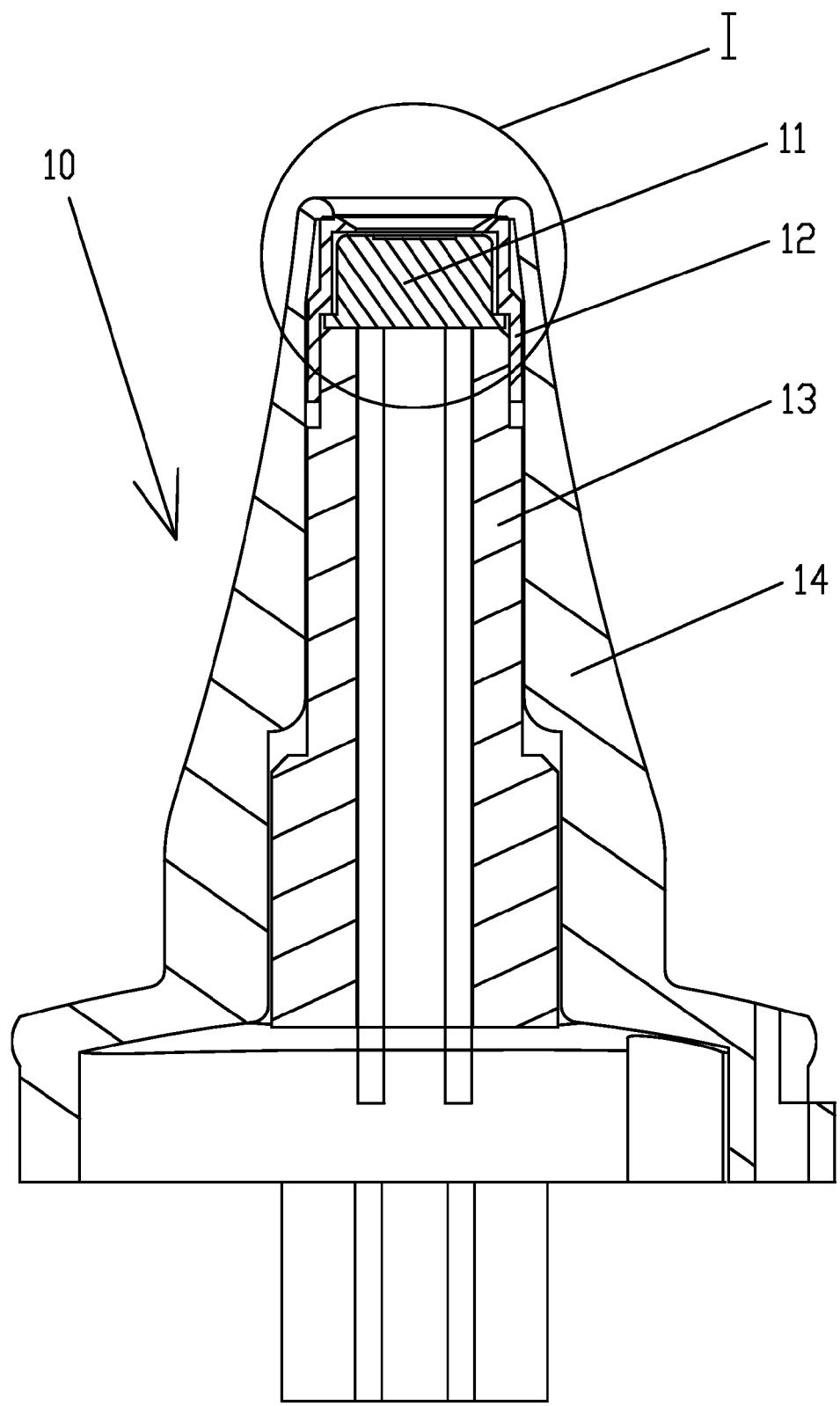
FIG. 1 is a cross sectional view of a temperature measurement head in accordance with one embodiment of the invention.
Figure 2:
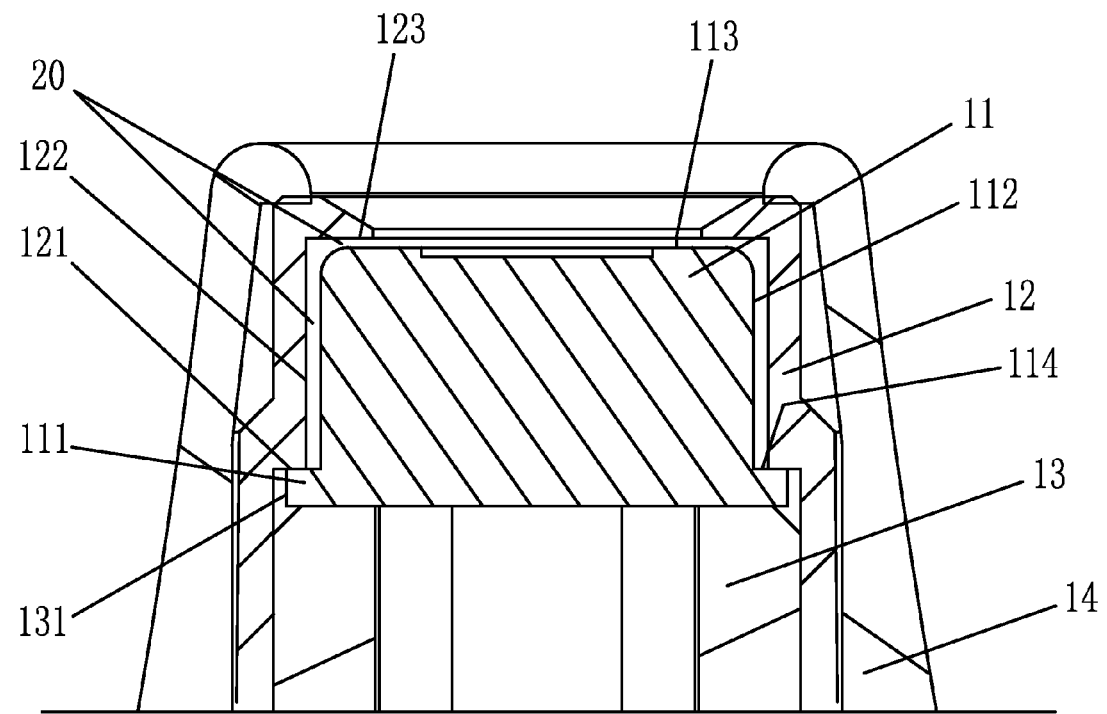
FIG. 2 is an enlarged view taken from part I of FIG. 1.

As shown in FIGS. 1-2, a temperature measurement head 10 comprises: a casing 14 (generally made of plastic materials), an aluminum tube 13 (can also be replaced by other tubular heat conductor such as a copper tube), a copper cap 12 (can also be replaced by other cap-shaped conductor, such as an aluminum cap), and an infrared sensor 11. Detecting holes are disposed at a front end of the casing 14 and a front end of the copper cap 12, respectively. The aluminum tube 13 is disposed inside the casing 14, a bottom surface of the infrared sensor 11 is attached to an end part of the aluminum tube 13 and is disposed at the detecting hole of the front end of the casing 14. The copper cap 12 surrounds the infrared sensor 11 and is tightly fitted over an outer wall of the end part of the aluminum tube 13 (or in transition fit, or in interference fit). The detecting hole of the front end of the copper cap 12 is disposed behind the detecting hole of the front end of the casing 14.

An air gap 20 is formed between an outer sidewall surface 112 and a top surface 113 of the infrared sensor 11 and corresponding inner sidewall surface 122 and inner bottom surface 123 of the copper cap 12, so that the outer sidewall surface and the top surface of the infrared sensor 11 are isolated from the corresponding inner sidewall surface and the inner bottom surface of the copper cap 12 by the air gap, and the heat energy of the casing 14 is prevented from transferring to the infrared sensor 11 via the copper cap 12, which otherwise results in temperature measurement errors. In this example, the complete isolation of the outer sidewall surface and the top surface of the infrared sensor 11 from the corresponding inner sidewall surface and the inner bottom surface of the copper cap 12 by the air gap 20 is realized by the following structure: as shown in FIG. 2, one end of the bottom surface of the infrared sensor 11 is provided with a ring-shaped flange 111, and the end part of the aluminum tube 13 fitting the infrared sensor 11 is provided with a recess 131 for positioning and fitting the ring-shaped flange 111. An inner side of the copper cap 12 is provided with a step 121 that fits an upper surface 114 of the ring-shaped flange 111 and presses the infrared sensor 11 on the end part of the aluminum tube 13. The fitting and positioning between the recess 131 and the ring-shaped flange 111 together with the tight fitting and positioning between the copper cap 12 and the aluminum tube 13 ensure that the air gap 20 completely isolates the outer sidewall surface 112 and the top surface 113 of the infrared sensor 11 from the corresponding inner sidewall surface 122 and inner bottom surface 123 of the copper cap 113.

Example 2

The temperature measurement head in this example is the same as that in Example 1 except that the isolation of the outer sidewall surface and the top surface of the infrared sensor 11 from the inner sidewall surface and inner bottom surface of the copper cap 12 by the air gap 20 is realized by the following structure: the infrared sensor 11 comprises a ring-shaped flange disposed at one end of the bottom surface thereof. An outer diameter of the ring-shaped flange is equivalent to an outer diameter of the end part of the aluminum tube 13 fitting the infrared sensor 11. An inner side of the copper cap 12 comprises a step that fits an upper surface of the ring-shaped flange and presses the infrared sensor 11 on the end part of the aluminum tube 13. The fitting and positioning between the outer sidewall of the ring-shaped flange and the inner sidewall of the copper cap 12 (in movable fit or in tight fit) ensures that the outer sidewall surface 112 and the top surface 113 of the infrared sensor 11 are completely isolated from the corresponding inner sidewall surface 122 and the inner bottom surface 123 of the copper cap 12 by the air gap 20.

It is convenient for the assembly between the copper cap 12 and the infrared sensor 11 to provide a chamfer or a fillet (not shown in FIGS. 1-2) at one side of the upper surface of the ring-shaped flange of the infrared sensor 11.

Example 3

The temperature measurement head of this example is the same as that in Example 1 except that the complete isolation between the outer sidewall surface and the top surface of the infrared sensor 11 and the corresponding inner sidewall surface and inner bottom surface of the copper cap 12 by the air gap 20 is realized by the following structure: the infrared sensor 11 comprises flanges disposed at one end of the bottom surface thereof (the flanges are asymmetrically or asymmetrically arranged at intervals, or only one flange section is adopted). The end part of the aluminum tube 13 fitting the infrared sensor 11 comprises a recess for positioning and fitting the flanges. An inner side of the copper cap 12 comprises a step that fits upper surfaces of the flanges and presses the infrared sensor 11 on the end part of the aluminum tube 13. The fitting and positioning between the recess and the flanges together with the tight fitting and positioning between the copper cap 12 and the aluminum tube 13 ensure that the outer sidewall surface 112 and the top surface 113 of the infrared sensor 11 are completely isolated from corresponding inner sidewall surface 122 and inner bottom surface 123 of the copper cap 12 by the air gap 20.

A thermometer comprises a thermometer body and a temperature measurement head mounted on the thermometer body. The thermometer body comprises a casing, a circuit module for measuring a temperature, a battery, a switch, and a displayer, which have been disclosed by the prior art and will not be repeated herein. The temperature measurement head adopts the structure as described in the above.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A temperature measurement head, comprising: a casing, a tubular conductor, a cap-shaped conductor, an infrared sensor, and an air gap;
   wherein
      both the casing and the cap-shaped conductor comprise a detecting hole at a front end thereof;
      the tubular conductor is disposed inside the casing; a bottom surface of the infrared sensor is attached to an end part of the tubular conductor and corresponds to the detecting hole of the front end of the casing;
      the cap-shaped conduct surrounds the infrared sensor and is tightly fitted over an outer wall of the end part of the tubular conductor;
      the detecting hole of the front end of the cap-shaped conductor is disposed behind the detecting hole of the front end of the casing; and
      the air gap is disposed between an outer sidewall surface and a top surface of the infrared sensor and corresponding inner sidewall surface and inner bottom surface of the cap-shaped conductor and completely separates the outer sidewall surface and the top surface of the infrared sensor from the corresponding inner sidewall surface and inner bottom surface of the cap-shaped conductor.

2. The temperature measurement head of claim 1, wherein the infrared sensor comprises a ring-shaped flange disposed at one end of the bottom surface thereof;
   the end part of the tubular conductor fitting the infrared sensor comprises a recess for positioning and fitting the ring-shaped flange;
   an inner side of the cap-shaped conductor comprises a step so as to fit an upper surface of the ring-shaped flange and press the infrared sensor on the end part of the tubular conductor; and
   the fitting and positioning between the recess and the ring-shaped flange together with the tight fitting and positioning between the cap-shaped conductor and the tubular conductor ensure the complete isolation of the outer sidewall surface and the top surface of the infrared sensor from the corresponding inner sidewall surface and inner bottom surface of the cap-shaped conductor by the air gap.

3. The temperature measurement head of claim 1, wherein the infrared sensor comprises a ring-shaped flange disposed at one end of the bottom surface thereof;

an outer diameter of the ring-shaped flange is equivalent to an outer diameter of the end part of the tubular conductor fitting the infrared sensor;

an inner side of the cap-shaped conductor comprises a step that fits an upper surface of the ring-shaped flange and presses the infrared sensor on the end part of the tubular conductor; and the fitting and positioning between an outer sidewall of the ring-shaped flange and an inner sidewall of the cap-shaped conductor ensures the complete isolation of the outer sidewall surface and the top surface of the infrared sensor from the corresponding inner sidewall surface and inner bottom surface of the cap-shaped conductor by the air gap.

4. The temperature measurement head of claim 3, wherein the ring-shaped flange comprises a chamfer or a fillet disposed at one side of the upper surface thereof.

5. The temperature measurement head of claim 1, wherein the infrared sensor comprises a flange disposed at one end of the bottom surface thereof;

the end part of the tubular conductor fitting the infrared sensor comprises a recess for positioning and fitting with the flange;

an inner side of the cap-shaped conductor comprises a step that fits an upper surface of the flange and presses the infrared sensor on the end part of the tubular conductor; and the fitting and positioning between the recess and the flange together with the tight fitting and positioning between the cap-shaped conductor and the tubular conductor ensure the complete isolation of the outer sidewall surface and the top surface of the infrared sensor from the corresponding inner sidewall surface and inner bottom surface of the cap-shaped conductor by the air gap.

6. A thermometer, comprising a thermometer body and a temperature measurement head disposed on the thermometer body; the temperature measurement head comprising: a casing, a tubular conductor, a cap-shaped conductor, an infrared sensor, and an air gap; wherein both the casing and the cap-shaped conductor comprise a detecting hole at a front end thereof;

the tubular conductor is disposed inside the casing; a bottom surface of the infrared sensor is attached to an end part of the tubular conductor and corresponds to the detecting hole of the front end of the casing;

the cap-shaped conduct surrounds the infrared sensor and is tightly fitted over an outer wall of the end part of the tubular conductor;

the detecting hole of the front end of the cap-shaped conductor is disposed behind the detecting hole of the front end of the casing; and the air gap is disposed between an outer sidewall surface and a top surface of the infrared sensor and corresponding inner sidewall surface and inner bottom surface of the cap-shaped conductor and completely separates the outer sidewall surface and the top surface of the infrared sensor from the corresponding inner sidewall surface and inner bottom surface of the cap-shaped conductor.

7. The thermometer of claim 6, wherein the infrared sensor comprises a ring-shaped flange disposed at one end of the bottom surface thereof;

the end part of the tubular conductor fitting the infrared sensor comprises a recess for positioning and fitting the ring-shaped flange;

an inner side of the cap-shaped conductor comprises a step so as to fit an upper surface of the ring-shaped flange and press the infrared sensor on the end part of the tubular conductor; and the fitting and positioning between the recess and the ring-shaped flange together with the tight fitting and positioning between the cap-shaped conductor and the tubular conductor ensure the complete isolation of the outer sidewall surface and the top surface of the infrared sensor from the corresponding inner sidewall surface and inner bottom surface of the cap-shaped conductor by the air gap.

8. The thermometer of claim 6, wherein the infrared sensor comprises a ring-shaped flange disposed at one end of the bottom surface thereof;

an outer diameter of the ring-shaped flange is equivalent to an outer diameter of the end part of the tubular conductor fitting the infrared sensor;

an inner side of the cap-shaped conductor comprises a step so as to fit an upper surface of the ring-shaped flange and press the infrared sensor on the end part of the tubular conductor; and the fitting and positioning between an outer sidewall of the ring-shaped flange and an inner sidewall of the cap-shaped conductor ensures the complete isolation of the outer sidewall surface and the top surface of the infrared sensor from the corresponding inner sidewall surface and inner bottom surface of the cap-shaped conductor by the air gap.

9. The thermometer of claim 8, wherein the ring-shaped flange comprises a chamfer or a fillet disposed at one side of the upper surface thereof.

10. The thermometer of claim 6, wherein the infrared sensor comprises a flange disposed at one end of the bottom surface thereof;

the end part of the tubular conductor fitting the infrared sensor comprises a recess for positioning and fitting with the flange;

an inner side of the cap-shaped conductor comprises a step that fits an upper surface of the flange and presses the infrared sensor on the end part of the tubular conductor; and the fitting and positioning between the recess and the flange together with the tight fitting and positioning between the cap-shaped conductor and the tubular conductor ensure the complete isolation of the outer sidewall surface and the top surface of the infrared sensor from the corresponding inner sidewall surface and inner bottom surface of the cap-shaped conductor by the air gap.

* * * * *